(12) United States Patent
Yang et al.

(10) Patent No.: US 10,608,531 B2
(45) Date of Patent: Mar. 31, 2020

(54) PRECISION CONTROL DEVICE FOR REGULATING A DC LOAD, AND ELECTRICAL ASSEMBLY COMPRISING THE CONTROL DEVICE

(71) Applicant: AgieMinds Micro Optics Co., Ltd., New Taipei (TW)

(72) Inventors: Chih-Yi Yang, Taipei (TW); Jui-Huang Cheng, Taipei (TW)

(73) Assignee: Agieminds Micro Optics Co., Ltd., New Taipei (TW)

( * ) Notice: Subject to any disclaimer, the term of this patent is extended or adjusted under 35 U.S.C. 154(b) by 0 days.

(21) Appl. No.: 16/123,547

(22) Filed: Sep. 6, 2018

(65) Prior Publication Data

US 2019/0081563 A1 Mar. 14, 2019

(30) Foreign Application Priority Data

Sep. 14, 2017 (CN) .......................... 2017 1 0825063

(51) Int. Cl.
| | | |
|---|---|---|
| *H05B 37/00* | (2006.01) | |
| *H02M 3/155* | (2006.01) | |
| *H02P 7/292* | (2016.01) | |
| *H02M 1/08* | (2006.01) | |
| *H05B 45/37* | (2020.01) | |

(52) U.S. Cl.
CPC ............. *H02M 3/155* (2013.01); *H02M 1/08* (2013.01); *H02P 7/292* (2013.01); *H05B 45/37* (2020.01)

(58) Field of Classification Search
CPC .......... H02M 1/08; H02M 3/155; H02P 7/292
See application file for complete search history.

(56) References Cited

U.S. PATENT DOCUMENTS

| | | | |
|---|---|---|---|
| 9,178,427 B1* | 11/2015 | Szolusha ............. | H02M 3/1588 |
| 2006/0220571 A1* | 10/2006 | Howell ............. | H05B 33/0812 |
| | | | 315/86 |
| 2013/0016310 A1* | 1/2013 | Kanemitsu ......... | H05B 33/0818 |
| | | | 349/69 |
| 2014/0265899 A1* | 9/2014 | Sadwick ............ | H05B 33/0812 |
| | | | 315/200 R |
| 2016/0099665 A1* | 4/2016 | Chen ....................... | B60L 50/66 |
| | | | 318/400.27 |

* cited by examiner

*Primary Examiner* — Muhammad S Islam
(74) *Attorney, Agent, or Firm* — Wang Law Firm, Inc.

(57) ABSTRACT

A precision control device generally includes a current-limiting resistance, a voltage control unit, and a feedback voltage regulation unit. The current-limiting resistance has a grounded end and is serially connected to a DC load. The voltage control unit includes a microprocessor, an ADC, and a DAC. The feedback voltage regulation unit includes at least one operational amplifier and a transistor having a control input, a collector, and an emitter. The transistor is configured to operate at an unsaturated region, wherein the control input thereof receives a signal sent from an output terminal of the operational amplifier. The precision control device enables a power supply to smoothly adjust a predetermined output voltage set value for the DC load in response to a deviation of a voltage applied to the DC load. As such, the current flowing through the DC load and the current-limiting resistance can be regulated at a stable level.

3 Claims, 8 Drawing Sheets

PRECISION CONTROL DEVICE FOR REGULATING A DC LOAD, AND ELECTRICAL ASSEMBLY COMPRISING THE CONTROL DEVICE

FIELD OF THE INVENTION

The present invention relates to a control device for a DC load and, more particularly, to a precision control device for a DC load, and an electrical assembly including the control device.

BACKGROUND OF THE INVENTION

Due to the natural resources being gradually depleted and the greenhouse effect becoming more and more serious, the electricity cost increases. Under this condition, various manufacturers have introduced various products that comply with environmental standards and energy conservation. Today, it is more stringent for a product to meet the requirements of environmental protection and green energy. In recent years, with the rapid development of LED-related technologies and the cost reduction, LEDs have been widely used in a variety of fields. In addition, an LED light has various advantages such as energy saving, excellent color saturation, long life, and environmental protection. Under today's environmental protection and energy-saving awareness, LED lights are gradually replacing conventional incandescent and fluorescent lamps, becoming the mainstream of the lighting products and expanding their applications in other fields.

For incandescent lamp, since the electro-optical conversion efficiency is not good, they do not meet the requirements of environmental protection and green energy. Generally, the luminous intensity of an incandescent lamp is adjusted through a silicon control dimmer, which however may produce a series of surge current to cause LEDs to flicker heavily, and furthermore, when the current flowing through the LEDs is too small, current harmonic distortion or even phase mismatch may occur. Thus, it is improper to simply use of a silicon control dimmer to adjust the luminous intensity of an LED light source.

Currently, the more mature technology is using PWM (pulse width modulation), which allows a transistor to be switched on/off at high frequency to drive LEDs to be bright and dark alternately at high frequency. The bright-dark frequency is much higher than the human eye can perceive. The brightness perceived by the human eye is based on the visual persistence, which is an average of the alternate brightness and darkness. By changing the on/off ratio in a period, a person can perceive a change of the luminous intensity of the LEDs. However, in addition to a high cost, the PWM control method can generate high-frequency EMI (electromagnetic interference). Furthermore, to keep away the human eyes from perceiving the flickering condition, the on/off period of the LEDs is relatively short. Therefore, when an LED light source is intended to operate at very low luminous intensity (for example 1% of the rated intensity), the conduction period is very short compared to a total period; that is, a circuit has to be turned on/off in very short time. However, an LED circuit usually takes some response time to change from an off state to a conduction state, thus causing the luminous intensity of the LED light source unable to meet the requirement.

If an LED light source is regulated by a constant current regulator (CCR), due to unavoidable drift of the output voltage of the power supply, the luminous intensity of the LED light source is unstable. Furthermore, a drift of the voltage may cause a drift of the wavelength, thus changing the color temperature. It is not easy for an LED light source controlled by a CCR to emit light less than 10% of its maximum luminous intensity.

The problem of luminous intensity drift and wavelength drift would become serious in some applications. For example, in a criminal investigation, a reagent such as luminol is usually sprayed at criminal scenes so as to determine blood stains, wherein ultraviolet (365 nm) or violet (405 nm) is used to excite the reagent to release a blue glow or fluorescence, so that a fluorescent-reaction result serving as evidence for analysis can be obtained. Due to the result depending on the wavelength and intensity of the excitation light, how to ensure these properties to remain unchanged and maintain accurate values in tests for evidence becomes a decisive factor on the credibility of the evidence.

In biotechnology identification, analysis has been developed from qualitative aspects to quantitative aspects. For example, in an experiment of gene transfer, in order to determine whether a specific gene is successfully transferred, an excitation light can be used to excite a fluorescent protein, which is often produced in a gene transfer, to confirm the presence of the fluorescent protein and the intensity of the fluorescent reaction. If there is a change of the wavelength of the excitation light, the fluorescent protein reaction may suddenly decrease to cause misjudgment. In some applications, such as determining the blood sugar concentration of diabetic people or the concentration of dioxin in food or articles, slight misjudgment is not allowed.

Data reproducibility is important for a criminal investigation, Dioxin concentration test, or blood glucose concentration test. For a commodity to be tested whether it contains dioxin, it is not allowed that the light source for the test has a drift in its light intensity or wavelength, because the drift may cause different results on different test dates, thus causing misjudgement and loss of data reproducibility. In a research for comparisons between experimental and control groups, a drift of the light intensity or wavelength may cause difficulty in analyzing the groups.

Furthermore, the human eye cannot detect the PWM signal, which takes only a few microseconds in each period. According to current technology, for example, a SONY camera can take up to thousands of pictures per second; a more advanced high-speed camera can take 50,000 pictures per second. Since the flickering of an LED light source can be recorded by a high-speed camera, the PWM control method is inapplicable to a test that requires a camera to take pictures.

Furthermore, patients lack of sunlight for a long time or people in high latitudes are susceptible to depression. Also, people lack of appropriate violet/UV light stimulation may lead to vitamin D deficiency. The aforementioned problems can be alleviated by providing appropriate blue light, violet light, or ultraviolet light to those persons. However, short-wavelength light carries higher energy each photon. A person may suffer skin cancer if exposed under short-wavelength light for a period of time. Nevertheless, it is quite helpful for vitamin D produced in the human body if a person is exposed under UV light with a specific wavelength and an extremely narrow bandwidth. In other words, the benefits would be significantly reduced if a person is exposed under UV light of other wavelengths.

In view of the foregoing, it is important for the voltage applied to an LED light source to be controlled at a precise level, so that the wavelength and luminous intensity of the LED light source can be controlled at a constant level. Conventional technology, such as PWM or CCR, has disadvantages, wherein the PWM method incurs higher cost and may cause high frequency EMI; the CCR method may cause a change of the luminous intensity or the color temperature. Particularly, either the CCR or PWM method is unsuitable for a light working at a low brightness state. The present invention provides an adjustable power supply, which can supply precise constant current to avoid a drift of its output voltage, so that a DC load can maintain its stable operation, and thus a light source using the power supply can ensure its quality.

SUMMARY OF THE INVENTION

One object of the present invention is to provide a precision control device, which can regulate a DC power supply and enables a DC load to be operated at a precise constant state.

A second object of the present invention is to provide a precision control device, which can regulate a DC power supply provided for a DC load, so that the DC load can be operated with data reproducibility to facilitate quantitative analysis.

A third object of the present invention is to provide a precision control device, which includes a transistor operated at an unsaturated region, so that a drift or deviation of the output voltage of a power supply can be nullified, and thus a DC load can be operated at a constant state.

A fourth object of the present invention is to provide a precision control device, which can regulate a DC load, so that the DC load can be operated at a precise and selected state.

A fifth object of the present invention is to provide an electrical assembly, which includes a precision control device and a DC light source capable of providing precise luminous intensity.

A sixth object of the present invention is to provide an electrical assembly, which includes a precision control device which allows the current flowing through an LED light source to be maintained at a precise level, so that the luminous quality of the LED light source can be ensured, and furthermore, EMI, wavelength drift, and luminous intensity drift, when the light source works at low brightness state, can be prevented.

The precision control device generally comprises a current-limiting resistance, a voltage control unit, and a feedback voltage regulation unit. The current-limiting resistance, which has two ends, is serially connected to a DC load, wherein one end of the resistance distal from the DC load is grounded. The voltage control unit includes a microprocessor and a DAC, wherein the DAC converts a digital signal issued from the microprocessor to a corresponding analog signal. The feedback voltage regulation unit includes at least one operational amplifier and a transistor. The operational amplifier has a noninverting input, an inverting input, and an output terminal, wherein the inverting input is connected to a second end of the current-limiting resistance opposite to the end being grounded, and the noninverting input is connected to the DAC for receiving the analog signal. The transistor, which has a control input, a collector, and an emitter, is configured to operate at an unsaturated region, wherein the control input is connected to the output terminal of the operational amplifier, and the collector and the emitter are connected between the DC load and the current-limiting resistance such that one of the connector and the emitter is connected to the DC load while the other one of the connector and the emitter is connected to the second end of the current-limiting resistance and connected to the inverting input of the operational amplifier so that the potential at the second end of the current-limiting resistance tends to follow the potential of the analog signal sent from the DAC, and thus the current flowing through the DC load and the current-limiting resistance can be regulated at a stable level.

The above precision control device can be used to regulate a sensitive DC load. However, a precision control device can be combined with a DC load to become an integral device, such as an electrical assembly disclosed in the present invention, which generally comprises a power supply, a DC load, and a control device. The power supply can provide DC power. The DC load receives the DC power from the power supply. The control device, which enables the power supply to smoothly adjust a predetermined output voltage set value for the DC load in response to a deviation of a voltage applied to the DC load, includes a current-limiting resistance, a voltage control unit, and a feedback voltage regulation unit. The current-limiting resistance, which has two ends, is serially connected to the DC load, wherein one end of the resistance distal from the DC load is grounded. The voltage control unit includes a microprocessor and a DAC, wherein the DAC converts a digital signal issued from the microprocessor to a corresponding analog signal. The feedback voltage regulation unit includes at least one operational amplifier and a transistor. The operational amplifier has a noninverting input, an inverting input, and an output terminal, wherein the inverting input is connected to a second end of the resistance opposite to the end being grounded, and the noninverting input is connected to the DAC for receiving the analog signal; the transistor is configured to operate at an unsaturated region and has a control input, a collector, and an emitter, wherein the control input is connected to the output terminal of the operational amplifier, the collector and the emitter are connected between the DC load and the current-limiting resistance, one of the connector and the emitter being connected to the DC load while the other one of the connector and the emitter being connected to the second end of the resistance and connected to the inverting input of the operational amplifier so that that the potential at the second end of the resistance tends to follow the potential of the analog signal sent from the DAC, and thus the current flowing through the DC load and the current-limiting resistance can be regulated at a stable level.

With the transistor configured to operate at an unsaturated region, a drift or deviation of the output voltage of the power supply can be nullified, and thus the current flowing through the DC load can be maintained at a precise predetermined level. Particularly, the control device of the present invention, which does not use high-cost PWM, which can emit high-frequency EMI, can control an LED light source properly to avoid wavelength drift and/or luminous intensity drift. Besides, the control device of the present invention can provide a more faithful control for a light source working at a low brightness state than PWM or CCR technology. With the control device, an accurate and reliable DC light source can be made and applicable in precision inspections or experiments, which require data reproducibility for quantitative analysis.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments with reference to the accompanying drawings. In the exemplary embodiments, same elements will be indicated by similar numerals or labels.

Figure 1:
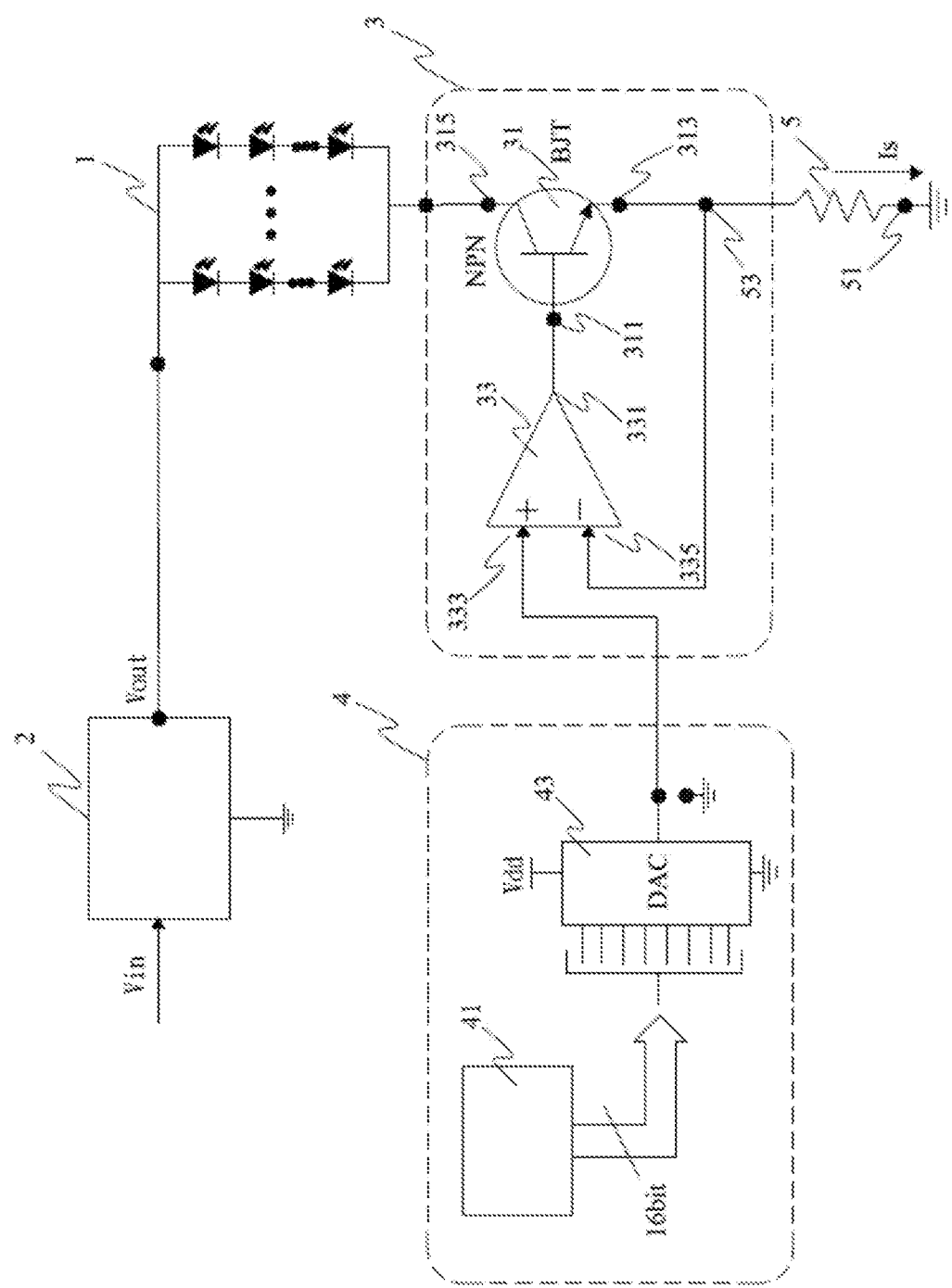
FIG. 1 shows a schematic circuit diagram according to a first embodiment of the present invention.

FIG. 1 shows a first embodiment of the present invention, which concerns a precision control device for regulating a DC load, and an electrical assembly comprising the control device, wherein the DC load 1 is an LED (light emitting diode) light source. The luminous intensity of an LED is mainly controlled by the current flowing therethrough. However, the driving voltage of an LED is not linear with the current flowing through the LED. A slight variation on the voltage applied to an LED may cause a significant change of the luminous intensity of the LED. In this embodiment, the power supply 2 is implemented as a DC power supply with a maximum voltage output of 50 volts, and the LED light source is constructed of four light strips connected in parallel, each light strip containing 10 LEDs. When the light source is turned on, the potential drop across each LED element is 3.3 volts, and thus the voltage drop between two opposite ends of each light strip is 33 volts. The luminous intensity of each light strip changes with the voltage applied thereto or the current flowing therethrough; however, there is no linearity therebetween.

The luminous intensity of an LED light strip is controlled by the amount of current flowing through the LED strip. To measure the current flowing through a DC load, a resistance can be connected in series with the DC load. Since the value of the resistance is known accurately, the current flowing through the DC load can be calculated. With this method, the amount of current flowing through the DC load 1 can be indirectly monitored. In this embodiment, a current-limiting resistance 5 is connected in series with the LED light source 1, wherein one end 51 of the resistance 5 distal from the LED light source 1 is grounded. The current (Is), which flows through the LED light source 1 as well as the current-limiting resistance 5, can be calculated by measuring the potential drop across the current-limiting resistance 5. Thus, by adjusting the potential drop across the resistance 5, the luminous intensity of the LED light source 1 can be adjusted.

However, the output voltage provided by the DC power supply 2 may inevitably have a slight drift or deviation. To completely eliminate a drift requires the use of very expensive components and circuits, making the cost of the power supply unaffordable. On the other hand, due to the characteristic of LEDs, the brightness of an LED element may change significantly even only a small voltage change, especially when the LED element operates at low luminous intensity. According to current technology, LEDs could hardly maintain a state of stable luminous intensity. To maintain a state of stable luminous intensity for LEDs, a feedback voltage regulation unit 3 is employed in the present invention. As shown, the feedback voltage regulation unit 3 includes an NPN-type bipolar junction transistor (BJT) 31, which has a base 311 serving as a control input, an emitter 313, and a collector 315, and an operational amplifier 33, which has a noninverting input (positive input) 333, an inverting input (negative input) 335, and an output terminal 331, wherein the transistor 31 is configured to operate at an unsaturated region. The control input 311 receives a voltage signal from the output terminal 331 of the operational amplifier 33, so that the transistor 31 produces an amplified voltage signal, and thus a suitable voltage between the emitter 313 and the collector 315 can be formed.

The collector 315 of the transistor 31 is connected to the DC load 1, and the emitter 313 of the transistor 31 is connected to a second end 53 of the current-limiting resistor 5 opposite to the grounded end 51, so that the sum of the voltage drop across the DC load 1 and the voltage drop across the resistor 5 can be obtained by subtracting the potential between the collector 315 and the emitter 313 from the DC output voltage of the power supply 2. By controlling the potential difference between the collector 315 and the emitter 313 of the transistor 31, the current flowing through the DC load 1 can be controlled at a desired level.

The potential difference between the emitter 313 and the collector 315 of the transistor 31 depends on the output signal of the operational amplifier 33. The operational amplifier 33 can compare the signal received at the noninverting input 333 with the signal received at the inverting input 335 to produce an amplified, in-phase output signal.

In this embodiment, the voltage control unit 4 includes a microprocessor 41 and a DAC (digital-to-analog converter) 43. The precision or resolution of the converted signal depends on the number of bits being used to represent a digital signal issued by the microprocessor 41. For example, if the DAC converts one 8-bit digital signal to a corresponding analog signal with 3V peak-to-peak range, there are 256 different levels that can be used to represent the signal; as a result, the resolution of the conversion is 11.7 mV/level. Similarly, for a DAC which converts one 16-bit signal to a corresponding analog signal with 3V peak-to-peak range, there are 65536 different levels that can be used to represent the signal; as a result; the resolution of the conversion is 46 uV/level. In either example, the analog signal converted by the DAC 43 is transmitted to the noninverting input 333 of the operational amplifier 33. In this embodiment, the emitter 313 of the transistor 31 is fed back to the inverting input 335 of the operational amplifier 33, so that the potential of the inverting input 335 or the second end of the resistance 5 tends to follow the potential of the analog signal from the DAC 43.

Although in the present embodiment, the DAC which converts an 8-bit or 16-bit digital signal into an analog signal is used, it is easily understood by those skilled in the art that a digital signal represented by a different number of bits can also be used. In addition, the transistor 31 operated at an unsaturated region can be an NPN or PNP BJT (bipolar-junction transistor), an IGBT (insulated-gate bipolar transistor), a transistor based on BiCMOS technology, and a Darlington transistor, which does not affect the implementation of the present invention.

Figure 2:
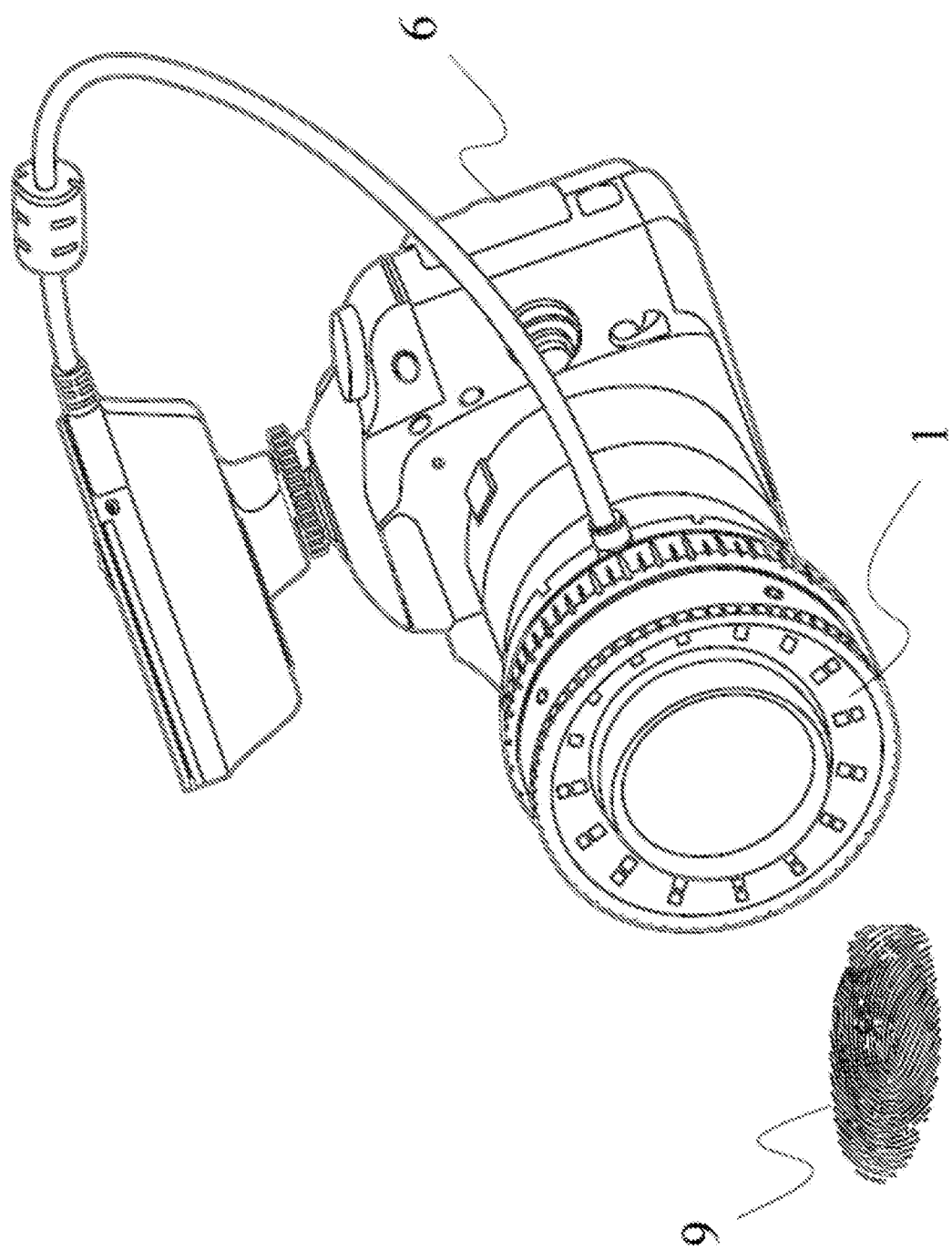
FIG. 2 shows a criminal investigation apparatus employing an LED light source as shown in FIG. 1.

Referring to FIG. 2 in conjunction with FIG. 1, the LED light source and the control device of the first embodiment can be applied to a high-speed image capturing device, such as a high-speed camera 6, wherein the DAC 43 of the control device converts a 16-bit digital signal issued from the microprocessor 41 based on a user's selection to a corresponding analog signal, which is in turn sent to the noninverting input 333 of the operational amplifier 33. Moreover, since the inverting input 335 is connected to the emitter 313 of the transistor 31, the potential at the second end of the resistance 5 or the inverting input 335 tends to follow the potential of the analog signal sent from the operational amplifier 33.

The inverting input 335 of the operational amplifier 33, the emitter 313 of the transistor 31, and the second end 53 of the resistance 5 are connected together and thus are equal in potential. Since the current flowing through the DC load 1 is same as that flowing through the resistance 5 which is accurately known, the current can be calculated by measuring the potential at the second end 53 of the resistance 5. Thus, if the transistor 31 is configured to operate at an unsaturated region, a drift or deviation of the output voltage of the power source 2 can be nullified by the potential difference between the collector 315 and the emitter 313 of the transistor 31, so that the potential at the second end 53 of the resistance 5 can be maintained at a substantially constant level. As a result, the voltage drop across the DC load 1 can be maintained at a substantially constant level, and thus the current flowing through the DC load 1 will not change. As such, when the LED light source of the camera works at a low brightness state, the LED light source can emit light accurately, and thus the image stability of the camera can be improved.

Furthermore, since the power supply 2 for driving the LED light source is using steady analog voltage output instead of PWM output, the flickering problem in high-speed photography can be avoided completely, so that the LED light source allows the camera to take over 1,000 pictures per second, or even up to 50,000 pictures per second. Of course, such a light source is also suitable for use in criminal identification and analysis. With the LED light source and the control device of the present invention, hidden fingerprints 9, blood traces, or other body fluids with fluorescent proteins can be quickly found. In particular, since the brightness and color of the LED light source do not deviate from their predetermined levels, images can be taken accurately for evidence, and the captured image data can be analyzed quantitatively, the investigation result can withstand repeat inspections and comparisons in court.

Figure 3:
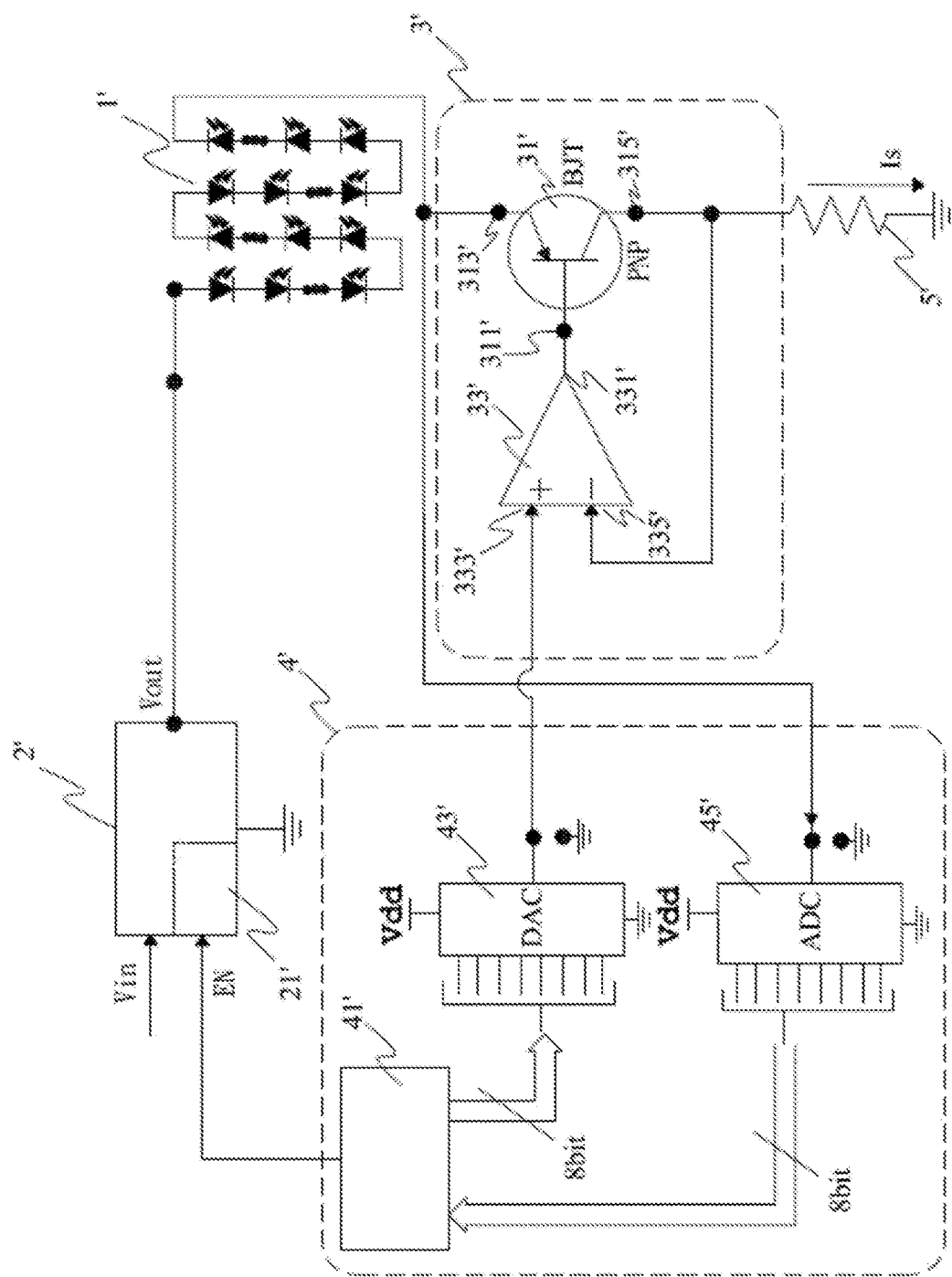
FIG. 3 shows a schematic circuit diagram according to a second embodiment of the present invention.

FIG. 3 shows a second embodiment of the present invention, which includes a DC load 1' implemented as an LED light source, a power supply 2', a feedback voltage regulation unit 3', a voltage control unit 4', and a current-limiting resistance 5', which are same as the previous embodiment except that the light strips of the LED light source 1' can be selectively connected in series or parallel, and the output voltage of the power supply 2' can be adjusted in response to a change of connection of the LED light strips. Similar to the previous embodiment, the transistor 31' is a PNP-type BJT, and the base 311', which serves as a control input, is connected to the output terminal 331' of the operational amplifier 33'. The collector 315' is connected to the current-limiting resistor 5' as well as the inverting input 335' of the operational amplifier 33'. The emitter 313' is connected to a negative end of the LED light source 1'. The voltage control unit 4' further includes an analog-to-digital converter (ADC) 45' in addition to the microprocessor 41' and the DAC 43'. The ADC 45' is connected to the negative end of the LED light source 1' and the emitter 313' of the transistor 31'. This allows the potential at the negative end of the LED light source 1' to be converted by the ADC 45' to a corresponding digital signal, which is in turn transmitted to the microprocessor 41'. If the output voltage of the power supply 2' is insufficient, the potential at the negative end of the LED strips is low or approaches zero. Upon the microprocessor 41' receives a low potential signal from the ADC 45', the microprocessor 41' can issue a boost signal (EN) to the boost/buck controller 21', by which a predetermined output voltage set value for the LED light source 1' can be adjusted, so that the power supply 2' can boost its output voltage gradually until the potential at the negative end of the LED strips returns to its normal value, and thus the LED light source 1' can be operated normally.

Figure 4:
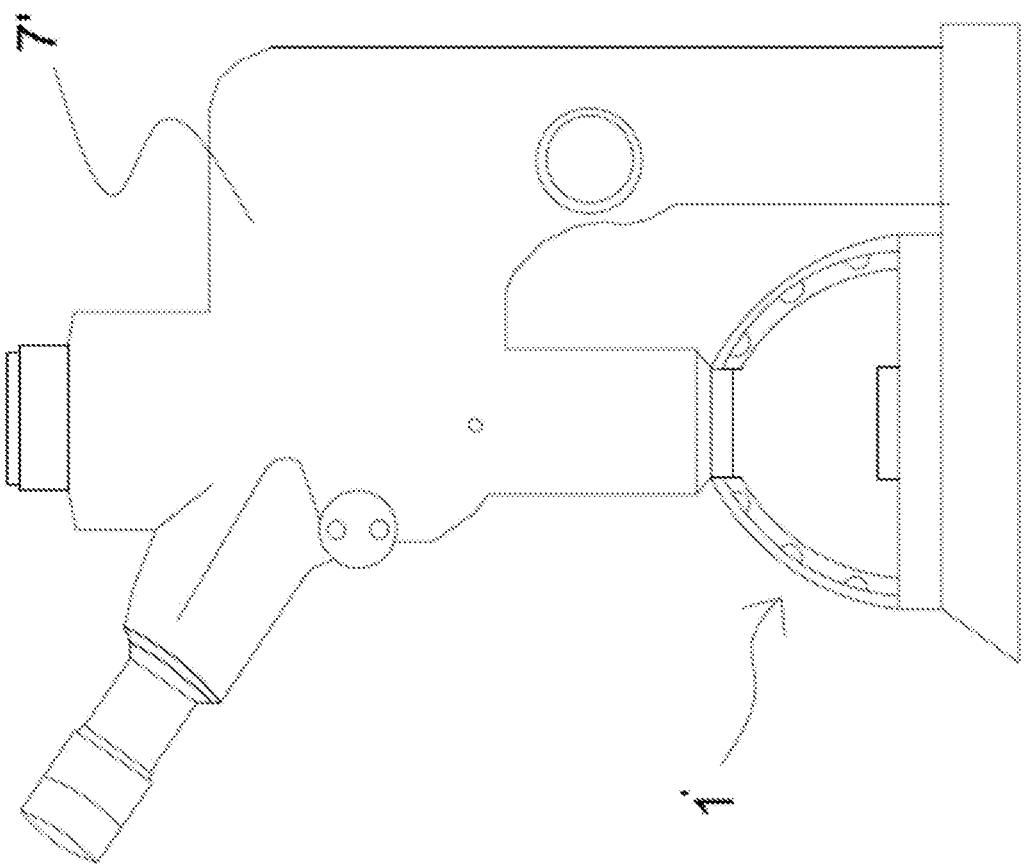
FIG. 4 shows a fluorescence microscope employing an LED light source as shown in FIG. 3.

Referring to FIG. 4 in conjunction with FIG. 3, which shows a fluorescent microscope 7' that uses the LED light source 1' of the second embodiment. When more light strips are connected in series, the microprocessor 41' can command the power supply 2' to boost its output voltage. When lower brightness light is required, the microprocessor 41' can issue a corresponding digital signal to the DAC', which in turn sends a corresponding analog signal to the operational amplifier 33', which in turn drives the transistor 31' to increase the potential between the emitter 313' and the collector 315', so that the voltage drop across the current-limiting resistance 5' is maintained at a predetermined level. Therefore, the current flowing through the LED light source 1' can be accurately controlled at a substantially constant level.

Figure 5:
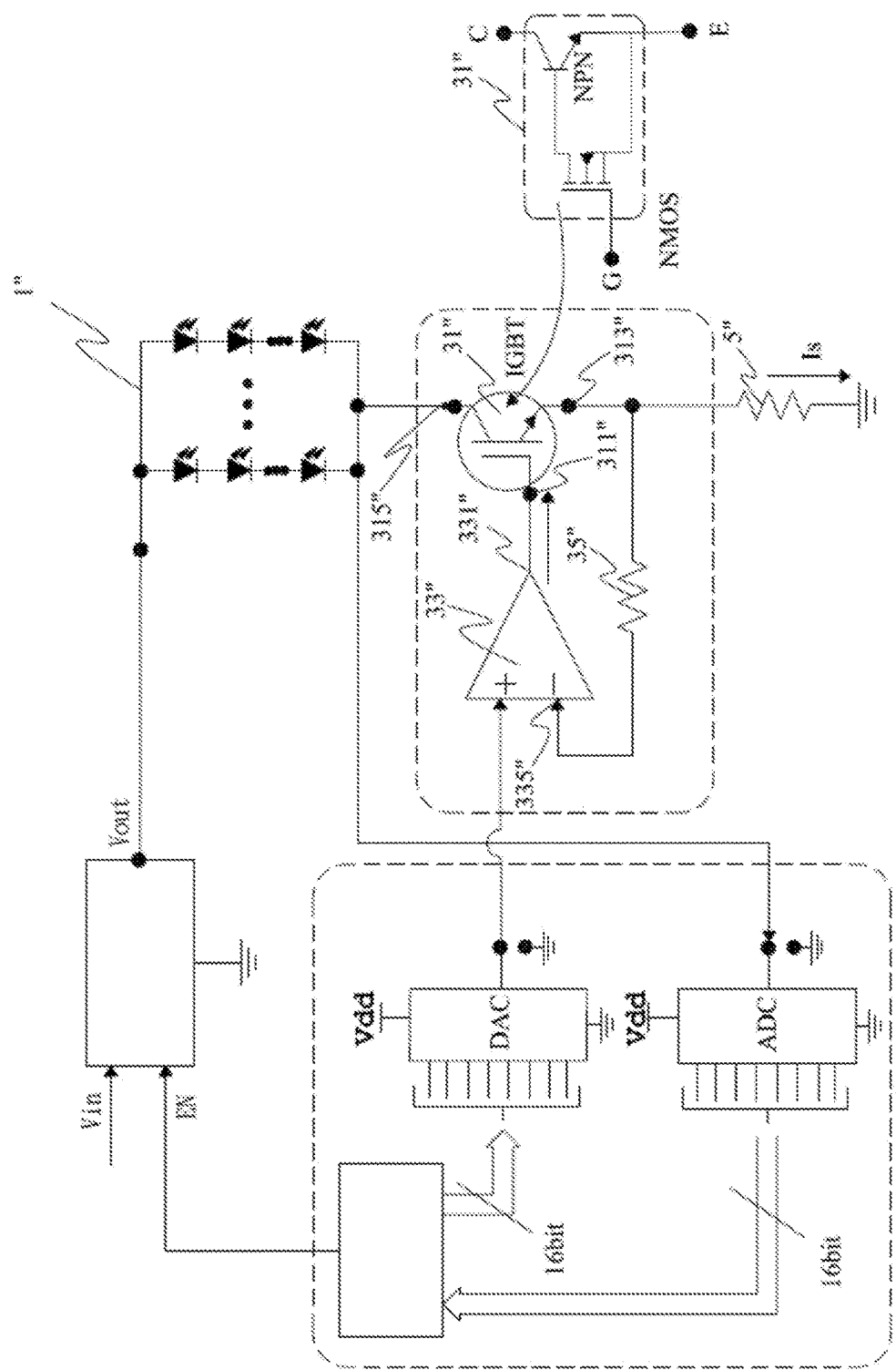
FIG. 5 shows a schematic circuit diagram according to a third embodiment of the present invention.
Figure 6:
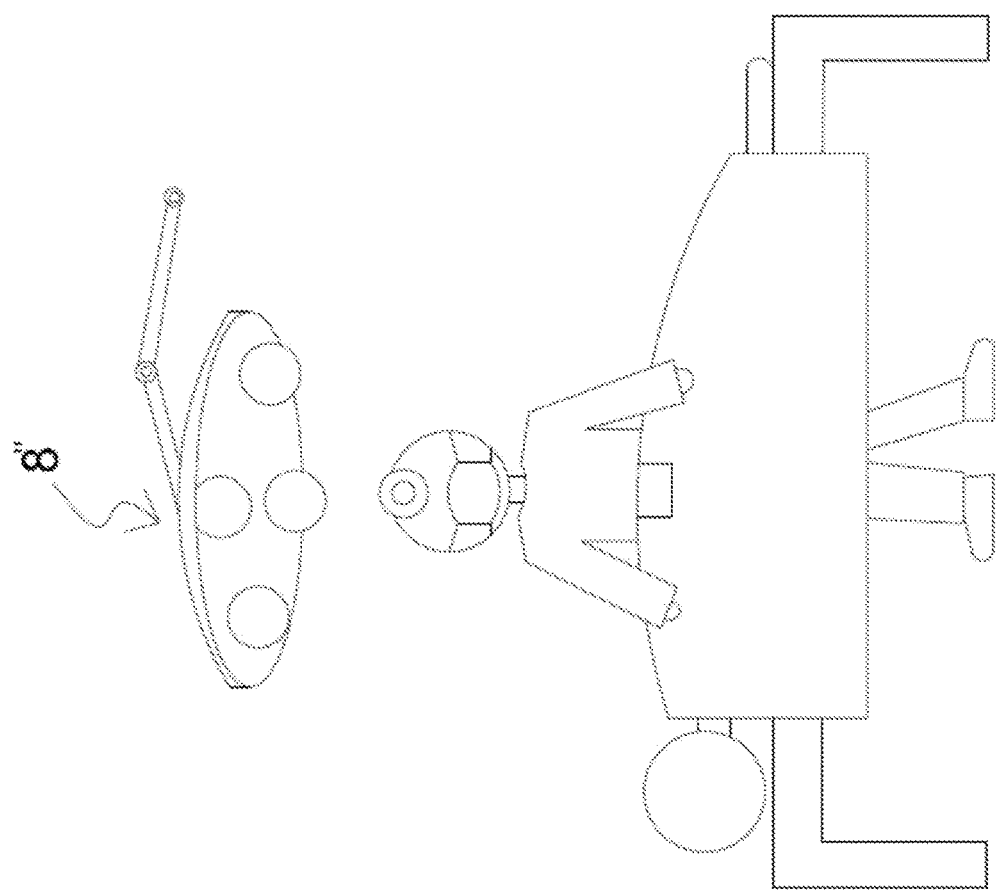
FIG. 6 shows a shadowless lamp employing an LED light source as shown in FIG. 5.

FIG. 5 shows a light source control device according to a third embodiment of the present invention. FIG. 6 shows a surgical lamp assembly using the light source control device. As shown, the transistor 31" is an insulated gate bipolar transistor (IGBT), which combines the futures of MOSFETs and the BJTs (NPN or PNP). In this embodiment, the IGBT employs a MOSFET and an NPN component, wherein the collector 315" of the NPN component is connected to the DC load 1", which is implemented as an LED light source; the gate 311" of the MOSFET, which serve as a control input, is connected to the output terminal 331" of the operational amplifier 33"; the emitter 313" of the NPN component is connected to the current-limiting resistor 5". As such, the current (Is) flowing through the LED light source 1" can be maintained at a substantially constant level. In addition, a feedback resistor 35" can be added between the current-limiting resistor 5" and the inverting input 335" of the operational amplifier 3" to increase the gain of the amplifier 33". It is required that the feedback resistance 35" has a proper value so that the IGBT 31" can work at an unsaturated region. The rest is similar to the previous embodiments.

In the event where one of the parallel-connected LED light strips of the DC load 1" is damaged, causing a decrease of the number of the parallel circuits, each of the remaining light strips will share a larger amount of current and thus is susceptible to overcurrent. As a result, the remaining light strips may be quickly and totally damaged. In order to avoid such a situation, those skilled in the art may know that an additional current-sensing element or light sensor may be provided for the LED light strips to monitor the current or luminous intensity at each light strip, which can be fed back to the microprocessor to have the output current of the DC power supply or the output of the voltage control unit controlled to compensate the effect caused by the decrease of the number of the parallel circuits of the DC load 1″, so that the remaining LED light strips can be prevented from excessive current. As such, the remaining LED light strips can be operated at a normal range, and thus accidental quick damages of the light strips can be avoided.

FIG. 6 shows a shadowless lamp 8″ used in a surgery room, which has gradually been changed to using an LED light source. However, conventional technology cannot ensure a light source free of a drift of the luminous intensity and the light color during a surgical or recording procedure. Contrary to conventional technology, the light source control device of the present invention can control luminous intensity and light color precisely. With the control device of the present invention, accurate lighting and brightness of the surgery room can be achieved, so that the contour and color of an object can be distinguished accurately, and thus the problems can be reduced greatly. In particular, a light source can be adjusted by the control device at any time according to the requirement of an application, thus ensuring the quality of ambient light during a medical treatment.

Figure 7:
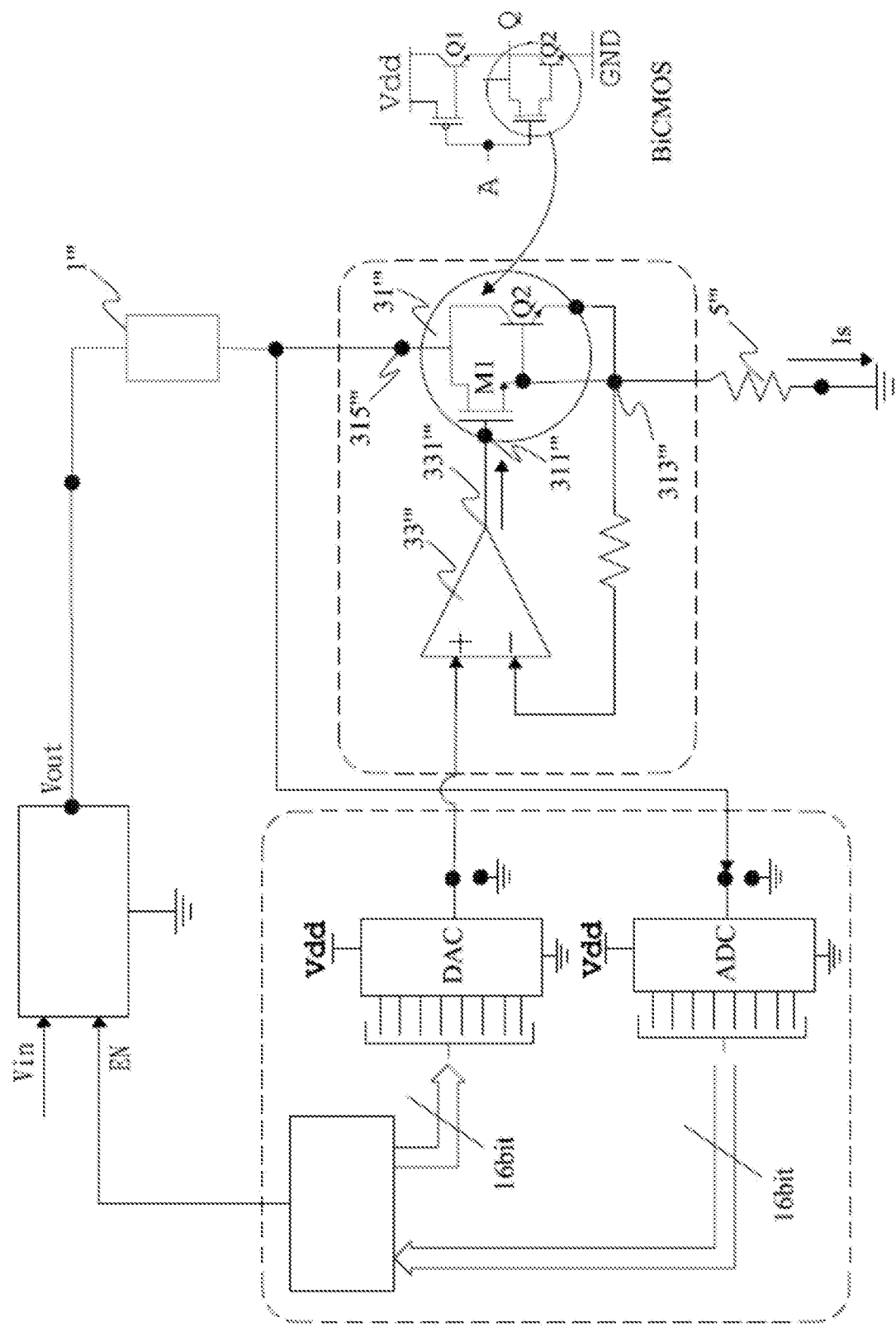
FIG. 7 shows a schematic circuit diagram according to a fourth embodiment of the present invention.

FIG. 7 shows a fourth embodiment of the present invention, wherein the DC load 1‴ is an infrared semiconductor laser element of 200 watts for laser engraving or laser cutting, wherein the driving voltage is only about 2 volts, but the current consumption is approximately 100 amps. Even a slight increase of the voltage may cause a significant increase of the current flowing through the element, thus damaging the element. For a laser engraving machine or laser cutting machine, since the machine can produce a lot of heat, the moving speed of the laser light source of the machine relative to a workpiece should be controlled accurately. For a proper engraving or cutting, either the laser light source or the driving motor of the machine has to respond quickly without a large error.

Generally, a transistor based on BiCMOS technology generally includes an n-channel MOSFET combined with an NPN/PNP component, and a p-channel MOSFET combined with an NPN/PNP component. In FIG. 7, the transistor 31‴ is shown to include a n-channel MOSFET combined with an NPN component, wherein the collector 315‴ of the NPN component is connected to the DC load 1‴; the gate 311‴ of the MOSFET, which serves as a control input, is connected to the output terminal 331‴ of the operational amplifier 33‴; the emitter 313‴ of the NPN component is connected to the current-limiting resistor 5‴. As such, the current (Is) flowing through the DC load 1‴ is controlled at a substantially constant level.

Figure 8:
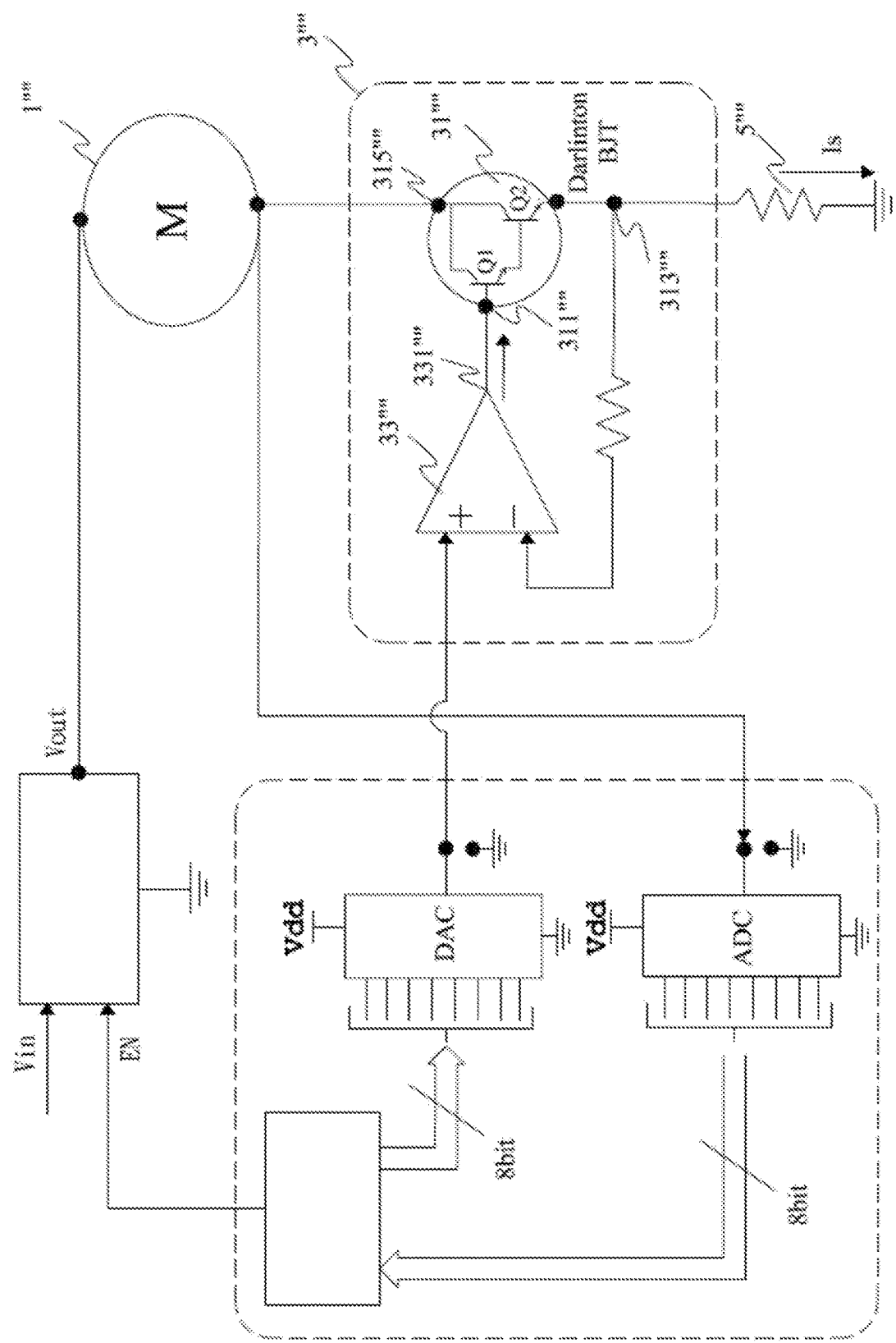
FIG. 8 shows a schematic circuit diagram according to a fifth embodiment of the present invention.

FIG. 8 shows a fifth embodiment of the present invention, wherein the DC load 1″″ is a motor; the feedback voltage regulation unit 3″″ includes a Darlington transistor 31″″, which are formed by two NPN components, wherein the collector 315″″ of the transistor is connected to the DC load 1″″; the base 311″″ of the transistor (at one NPN component), which serves as a control input, is connected to the output terminal 331″″ of the operational amplifier 33″″; the emitter 313″″ of the transistor (at another NPN component) is connected to the current-limiting resistor 5″″. As such, the current (Is) flowing through the DC load 1″″ is controlled at a substantially constant level. Of course, one skilled in the art can easily understand that the transistor can have more than two components to increase the total current gain.

Since the transistor of the feedback voltage regulation unit disclosed in the present disclosure is configured to operate at an unsaturated region, and the operational amplifier outputs a signal to the control input of the transistor, any drift or deviation in the output voltage of the power supply can be nullified by the transistor to have the potential across the current-limiting resistance maintained at a stable level, which corresponds to the digital signal issued from the microprocessor. Therefore, the current flowing through the DC load can be maintained a stable level; namely, the current flowing through the DC load can be stabilized. With the present invention, the problem due to power supply voltage drift can be eliminated, and the DC load can be operated at a predetermined state, without using PWM, and thus high-frequency EMI can be avoided. Moreover, when the DC load is an LED light source, the problem of wavelength or brightness drift, as commonly seen in CCR-controlled light sources, can be avoided. The feedback voltage regulation unit can respond to a digital signal issued from the microprocessor and control the LED light source with accuracy to allow the LED light source to operate at a low-brightness state. The control device of the present invention, including the voltage control unit and the feedback voltage regulation unit, allows the LED light source to be controlled more precisely than the existing PWM control technology and CCR technology. When the LED light source is applied in a test or experiment, precision and reliability can be increased, and thus data reproducibility can be obtained to facilitate quantitative analysis.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

What is claimed is:

1. An electrical assembly, comprising:
   a power supply capable of providing DC power and including a boost-buck controller;
   a DC load receiving the DC power from the power supply;
   a control device enabling the power supply to smoothly adjust a predetermined output voltage set value for the DC load in response to a deviation of a voltage applied to the DC load, the control device including:
   a current-limiting resistance serially connected to the DC load and having two ends, one end of which distal from the DC load is grounded;
   a voltage control unit, including a microprocessor and a DAC and an ADC, wherein the microprocessor is connected to the boost-buck controller via a signal line; the DAC converts a digital signal issued from the microprocessor to a corresponding analog signal; and
   a feedback voltage regulation unit, including at least one operational amplifier and a transistor; the operational amplifier has a noninverting input, an inverting input, and an output terminal, wherein the inverting input is connected to a second end of the resistance opposite to the end being grounded, and the noninverting input is connected to the DAC for receiving the analog signal; the transistor is configured to operate at an unsaturated region and has a control input, a collector, and an emitter, wherein the control input is connected to the output terminal of the operational amplifier, the collector and the emitter are connected between the DC load and the current-limiting resistance, one of the connector and the emitter being connected to a negative end of the DC load while the other one of the connector and the emitter being connected to the second end of the resistance and connected to the inverting input of the operational amplifier so that the potential at the second end of the resistance tends to follow the potential of the analog signal sent from the DAC, and thus the current flowing through the DC load and the current-limiting resistance is regulated at a stable level; wherein the ADC is connected between the microprocessor and the DC load for converting a voltage at the negative end of the DC load, which equals a potential drop across the transistor and the current-limiting resistance, to a digital signal, which is sent back to the microprocessor; if the voltage measured at the negative end of the DC load is unsuitable, the microprocessor commands the boost-buck controller to adjust the predetermined output voltage set value provided by the power supply for the DC load.

2. The electrical assembly of claim 1, wherein the DC load is a set of LEDs.

3. The electrical assembly of claim 1, wherein the DC load is a DC motor.

* * * * *